Feb. 4, 1941.  J. A. HORTA  2,230,644
FLUSH VALVE
Filed Dec. 27, 1938
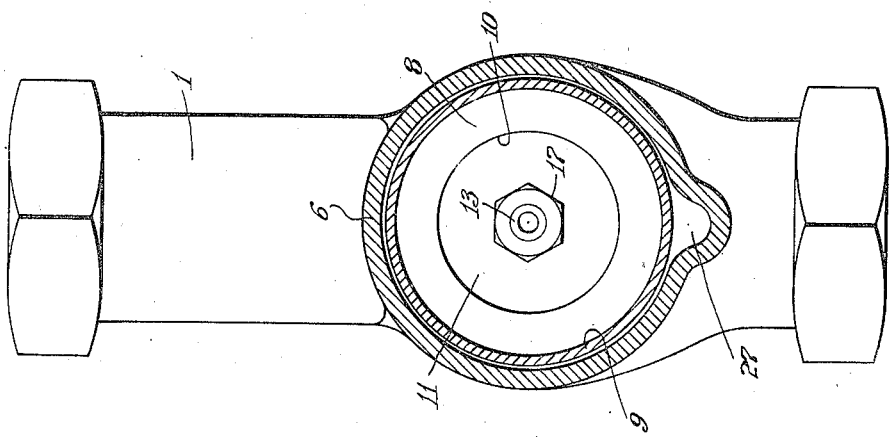
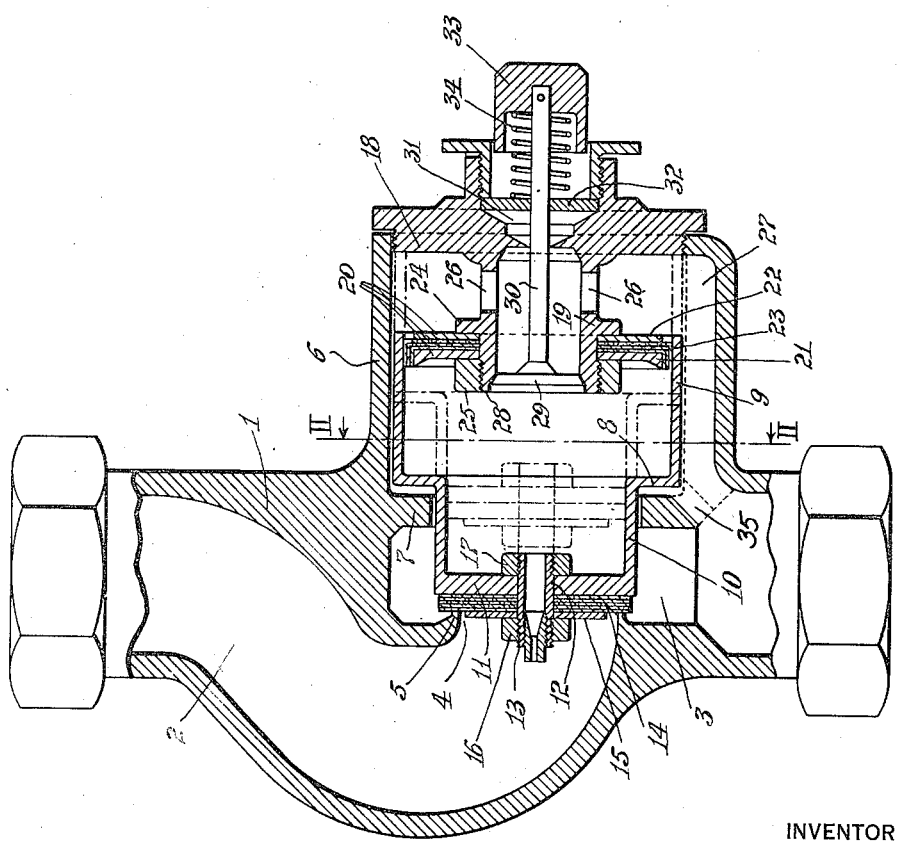
INVENTOR
Jair Alves Horta
BY Otto Munk
ATTORNEY Patented Feb. 4, 1941

2,230,644

UNITED STATES PATENT OFFICE 2,230,644

FLUSH VALVE

Jair Alves Horta, Sao Paulo, Brazil

Application December 27, 1938, Serial No. 247,778
In Brazil January 6, 1938

3 Claims. (Cl. 137—93)

The present invention refers to flush valves, and more particularly to flush valves of the type comprising a cylinder in which a valve element is slidably guided to form a chamber of variable capacity and means to temporarily release the pressure in said variable capacity chamber.

One object of the present invention is to produce a valve of this type which is of simple, practical construction, and consists of relatively few parts so as to be positive and reliable in its operation.

Another object of the invention is to provide a valve which can be easily taken apart and reassembled for cleaning purposes.

A further object is to produce a valve of the type set forth, in which the guide cylinder is not subjected to the hydraulic pressure acting upon the movable valve element guided therein.

The above and other objects, which will become apparent as the description proceeds, are accomplished by the construction and combination of elements specified in the following detailed description, set forth in the appended claims and illustratively exemplified in the accompanying drawing, in which—

Fig. 1 is a vertical longitudinal section of a valve according to the invention; and Fig. 2 is a cross-section taken on line II—II of Fig. 1.

In the figures, 1 denotes a valve casing comprising a pressure conduit 2 and a discharge conduit 3. An opening 4 surrounded by a valve seat 5 is provided in the pressure conduit 2 and connects the same with the discharge conduit 3. Coaxial with the valve seat opening 4, there is disposed a guide cylinder 6 having its inner end spaced from said opening 4 and provided with an inwardly projecting annular flange 7 the inner diameter of which exceeds that of the valve seat opening 4. The closure element of the valve comprises a stepped hollow piston 8, including a rear portion 9 slidably guided in the cylinder 6 and a front portion 10 of smaller diameter slidably guided in the annular flange 7. The front wall 11 of the piston 8 is provided with a central bore 12. A tubular feed nozzle 13, screw threaded on both ends thereof extends through the bore 12 and through central openings in a packing disc 14 and a washer 15, applied to the outer face of the front wall 11 of piston 8. Nuts 16 and 17 hold the nozzle 13, the packing 14 and the washer 15 in fixed position on the front wall 11 of the piston 8.

The rear end of the cylinder 6 is internally threaded and closed by a screwed in cover 18. A tubular element 19 projects inwardly from said cover and carries mounted thereon adjacent its inner end a stationary plunger 20. The plunger 20 consists of two metal discs 21 and 22 and an intermediate packing disc 23 pressed against a flange 24 of the tubular member 19 by means of a ring nut 25. The part of the tubular element 19 between the plunger 20 and the rear cover 18 is provided with perforations 26 connecting the interior of element 19 with the interior of cylinder 6. A passage 27 formed in the wall of the cylinder 6 connects the rear part of the cylinder 6 with the discharge duct 3.

The innermost end of the tubular element 19 is formed as a valve seat 28, held normally closed by a valve head 29 mounted on a valve stem 30, which latter extends through a perforation in the cover 18, a packing gland 31 and a pressure plate 32. A press-button 33 is mounted on the outer end of the valve stem 30 and a coil spring 34 arranged between the pressure plate 32 and the button 33 and surrounding the valve stem 30, holds the valve head 29 normally in closed position against the seat 28.

An auxiliary duct 35 connects the forward end of cylinder 6 with the discharge duct 3.

The device operates as follows: At the beginning of each cycle, the hollow piston 8 is in the position indicated in Fig. 1 in full lines, in which the opening 4 is closed by the packing disc 14 being pressed against the valve seat 5. The hollow piston 8 is held in this position against the pressure of the water in the pressure duct 2 by means of the water present in the variable capacity chamber formed by the hollow piston 8 and the stationary plunger 20.

When now the button 33 is pressed, the valve 28/29 is opened and the variable capacity chamber is connected to the discharge duct 3 through the tubular element 19, the perforations 26 and the passage 27 in the cylinder wall. Thus, the pressure in the variable capacity chamber is released and the piston 8 is moved away from the valve seat 5 into the position indicated in dot and dash lines in Fig. 1, whereupon the water can pass freely from the pressure duct 2 to the discharge duct 3.

As soon as the button 33 is released, the connection between the variable capacity chamber and the discharge duct 3 is interrupted by the valve 29 being closed.

During the discharge period, part of the water supplied from the pressure duct 2, enters the feed inlet nozzle 13. As soon as the connection between the variable capacity chamber and the discharge duct 3 is interrupted, the pressure within the chamber starts to rise. Owing to the stepped shape of the piston 8 and to the presence of the cylinder flange 7, the water pressure from within the piston 8 acts on a greater area than the outside pressure. Consequently, the piston 8 is moved back to its original closed position, whereby the cycle of operation is completed. The interval between the closing of valve 29 and the return of piston 8 to its original position and, thus the length of time for which the discharge continues after the starting impulse has ceased, is predetermined by the diameter of the feed inlet nozzle 13.

Any water, which in the rear position of piston 8, happens to enter the front part of the cylinder 6 adjacent the flange 7, is instantaneously discharged through the auxiliary duct 35, so as to prevent the exertion of any hydraulic pressure onto the inner walls of cylinder 6.

Having now particularly described and ascertained the nature of my said invention and in what manner the same is to be performed, I declare that what I claim is:

1. A flush valve, comprising a pressure duct, a discharge duct, said pressure duct being provided with an opening connecting the same to said discharge duct, a valve seat surrounding said opening, a hollow cylinder having a closed outer end and an open inner end spaced from and facing said valve seat and carrying an inwardly projecting annular flange with an inner diameter exceeding that of said opening, a stepped hollow piston having a rear portion slidably guided in said cylinder and a front portion slidably guided in said annular flange, said front portion including a closed front end adapted to be pressed against said valve seat so as to close said opening, a stationary plunger in said rear portion of the hollow piston, a restricted feed inlet in the closed front end of said piston, pressure relief passages in said plunger and cylinder wall of a cross-section exceeding that of the feed inlet to connect the interior of said hollow piston with said discharge duct, means to normally hold said pressure relief passages closed, and hand-operated means to temporarily open said closing means.

2. A flush valve, as claimed is claim 1, comprising an auxiliary duct connecting the inner part of said cylinder adjacent said flange with said discharge duct.

3. A flush valve, as claimed in claim 1, in which said pressure relief passage in said cylinder wall comprises a depressed channel in the cylinder wall extending lengthwise of the cylinder from the outer part thereof to the discharge duct.

JAIR ALVES HORTA.